United States Patent [19]

Shepperd

[11] Patent Number: 4,905,812
[45] Date of Patent: Mar. 6, 1990

[54] APPARATUS FOR COOLING A CLUTCH ASSEMBLY WITH A HYDRAULIC FLUID

[75] Inventor: James L. Shepperd, Waukegan, Ill.

[73] Assignee: J. I. Case Company, Racine, Wis.

[21] Appl. No.: 303,276

[22] Filed: Jan. 26, 1989

[51] Int. Cl.⁴ .............................................. F16D 13/72
[52] U.S. Cl. .............................. 192/113 B; 192/70.12
[58] Field of Search ........... 192/70.12, 85 AA, 113 B; 188/264 E

[56] References Cited

U.S. PATENT DOCUMENTS

| 3,080,774 | 3/1963 | Nickerson et al. | 192/113 B X |
| 3,105,582 | 10/1963 | Ziabicki | 192/113 B |
| 3,823,802 | 7/1974 | Winzeler et al. | 192/113 B |
| 4,134,483 | 1/1979 | Horsch | 192/113 B |
| 4,157,750 | 6/1979 | Horsch | 192/113 B |
| 4,270,647 | 6/1981 | Leber | 192/113 B |
| 4,321,990 | 3/1982 | Koch, Jr. | 192/113 B X |
| 4,811,614 | 3/1989 | Lasoen | 192/70.12 X |

FOREIGN PATENT DOCUMENTS 61-266834 11/1986 Japan .............................. 192/113 B
85/01332 3/1985 World Int. Prop. O. ...... 192/113 B Primary Examiner—Leslie A. Braun
Assistant Examiner—Richard M. Lorence
Attorney, Agent, or Firm—Dressler, Goldsmith, Shore, Sutker & Milnamow, Ltd.

[57] ABSTRACT

A fluid conduit delivers hydraulic cooling fluid to a mechanism including a clutch assembly which releasably joins two members rotatably mounted on a shaft. A linearly positionable clutch actuator controls operation of the clutch assembly. To avoid flooding of the clutch area with cooling fluid, a mechanism is provided for metering fluid flow delivered to the clutch area as a function of clutch operation. The mechanism includes a sleeve coaxially mounted on the shaft for metering the fluid flow exhausted from the fluid conduit in response to movement of the clutch actuator.

2 Claims, 1 Drawing Sheet

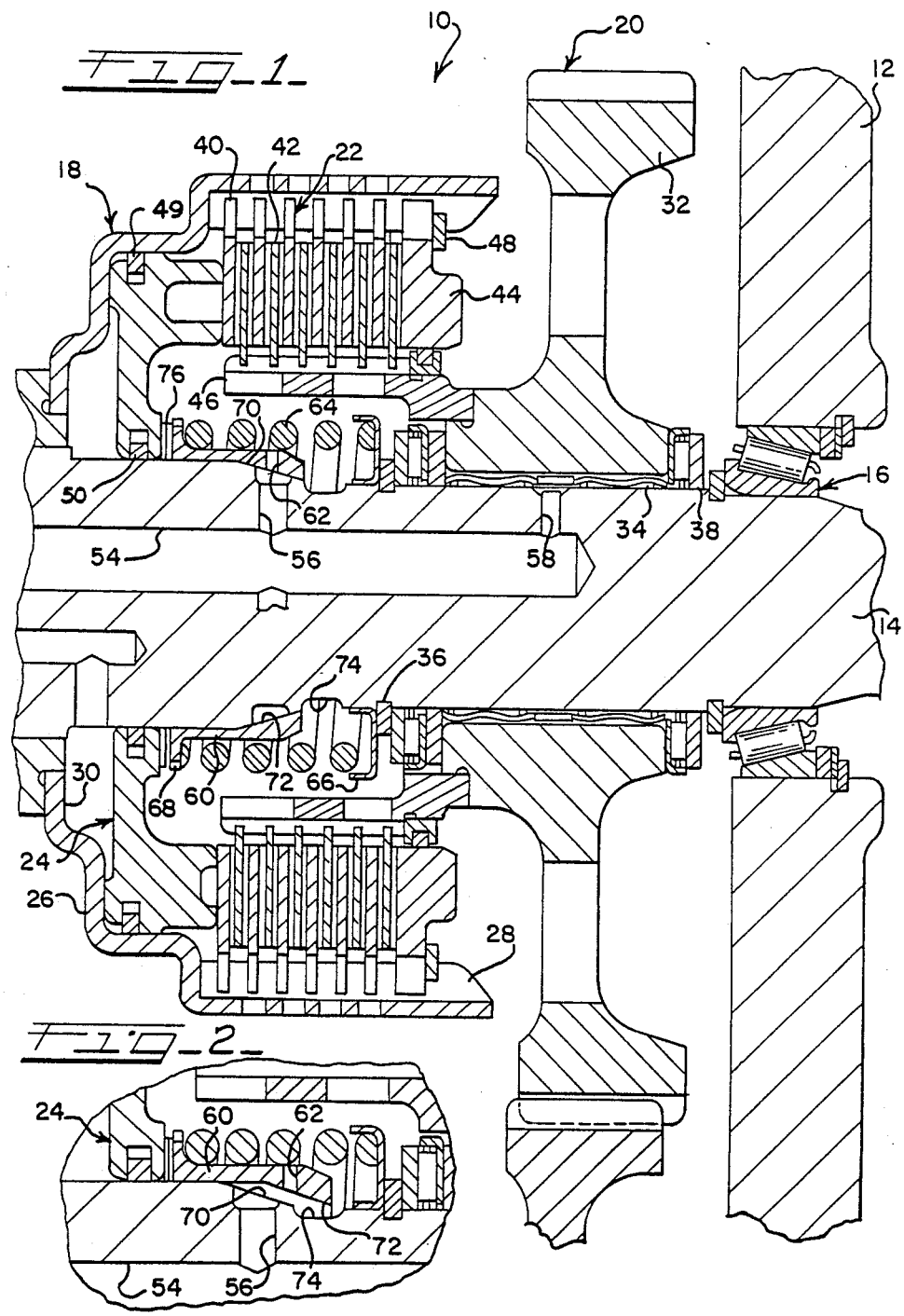

APPARATUS FOR COOLING A CLUTCH ASSEMBLY WITH A HYDRAULIC FLUID

FIELD OF THE INVENTION

The present invention relates to hydraulically actuated clutch assemblies and, more particularly, to a method and apparatus for automatically regulating hydraulic cooling of a clutch assembly as a function of clutch operation.

BACKGROUND OF THE INVENTION

Clutch assemblies are used in transmissions and the like to join a rotatable drive member with a rotatably driven member. Depending on the particular design, several clutch assemblies may be used in combination to establish different drive connections throughout the transmission.

Each clutch assembly includes a series of interleaved friction plates defining a clutch area. Alternate ones of the friction plates rotate with the drive member and the remaining friction plates rotate with the driven member.

A clutch actuator is used to engage the clutch assembly. A typical actuator comprises a piston-like member arranged in a fluid chamber usually defined by the drive member. The actuator applies a linear compressive force against the friction plates in a manner selectively establishing a drive connection between the drive and driven members.

During modulated engagement of the clutch assembly, the friction plates slip relative to each other. As will be appreciated, heat input results from the slipping action between the plates. Excess heat will destroy the clutch assembly thus involving timely and costly repairs. Thus, heat input must be removed before reengagement of the clutch assembly.

To dissipate heat build up, it is known to flood the clutch area with hydraulic cooling fluid. Although the cooling fluid dissipates the heat developed by the slipping friction plates, additional problems are created when the clutch area is flooded with cooling fluid.

As mentioned, several clutch assemblies may be arranged within a transmission to develop different drive connections during operation of the transmission. Each clutch assembly requires a separate cooling fluid flow thereto to dissipate the heat build up for that particular clutch assembly. As will be appreciated, to provide a sufficient cooling fluid flow to several clutch assemblies normally requires a sufficiently large fluid pump and reservoir from which the hydraulic cooling fluid is supplied under pressure, thus adding to the size, weight, and complexity of the construction.

Flooding the clutch area with cooling fluid also creates a viscous drag condition on the clutch assembly. When the clutch assembly is disengaged, the friction plates connected to the drive member may rotate relative to the friction plates connected to the driven member. The cooling fluid in the clutch area creates a viscous drag condition between the relatively rotating friction plates. This condition causes a loss in horsepower and also produces heat in the clutch assembly.

SUMMARY OF THE INVENTION

In view of the above, and in accordance with the present invention, there is provided a method and apparatus for dissipating heat input during modulated engagement of a clutch assembly. Rather than continually flooding a clutch area with hydraulic cooling fluid, the present invention contemplates delivering metered quantities of hydraulic cooling fluid to a clutch area as a function of clutch operation.

The hydraulic clutch cooling system of the present invention is readily adaptable to a device or mechanism that uses a hydraulically operated clutch assembly with a linearly displaceable clutch actuator for establishing and disestablishing a drive connection between a drive member connected to a rotating shaft and a driven member. The cooling system of the present invention is especially beneficial to tractor transmissions wherein several relatively small sized clutch assemblies are provided in the transmission for transferring relatively large torque loads between rotating members. As should be appreciated, tractors and the like develop relatively high torque loads and low ground speeds. To effect such ends, several clutch assemblies are used throughout a tractor transmission to develop multi-gear ratios through which the tractor is operated.

Broadly stated, the cooling system of the present invention includes a fluid conduit for delivering cooling fluid to a clutch area whereat a drive member is joined to a driven member. Such a conduit may include several branches for simultaneously delivering cooling fluid to more than one clutch assembly. To avoid continually flooding the clutch area with cooling fluid, the present invention contemplates a mechanism for metering the fluid flow from the exhaust port of each branch as a function of clutch operation.

In a preferred form of the invention, the fluid conduit includes an axially extended fluid passage defined by the shaft whereon the drive and driven members are mounted for rotation. The fluid passage in the shaft defines one or more exhaust ports from which fluid is delivered to the clutch area of a clutch assembly.

The mechanism for metering the fluid flow from the conduit preferably includes a sleeve which is coaxially mounted on the shaft. The sleeve is mounted for movement between first and second positions in response to movement of the clutch actuator associated with the clutch assembly. In a preferred form of the invention, the sleeve defines a radial port which meters and limits fluid flow from the fluid passage when the sleeve is in a first position to promote lubrication between the friction plates of a disengaged clutch assembly.

The shaft on which the drive and driven members are mounted is provided with a tapered seat. The present invention further includes a resilient member for normally biasing the sleeve against the tapered seat. The shaft further defines a circumferential groove which is linearly adjacent the tapered seat and which cooperates with the sleeve for permitting a substantially unrestricted fluid flow to the clutch assembly when the sleeve is moved toward its second position.

The present invention is also directed to a method of cooling a clutch assembly which is selectively operable between engaged and disengaged positions. The method includes the steps of directing a hydraulic cooling fluid to the clutch assembly through a conduit having an exhaust port arranged proximate to the clutch assembly, and automatically regulating the amount of fluid flow from the exhaust port as a function of clutch operation.

Directing a cooling fluid to the clutch assembly allows the heat input created between the slipping friction plates to be dissipated in a manner protecting the clutch assembly against damage. Automatically regulating the amount of fluid exhausted to the clutch area as a function of clutch operation yields two beneficial results. First, it makes the most efficient use of available cooling fluid flow to cool the recently engaged clutch within the transmission or the like. Second, there is a reduction in fluid flow to a disengaged clutch. A reduction in fluid flow to the disengaged clutch minimizes the viscous drag problem. As such, the friction elements associated with the drive member are allowed to rotate relative to the friction elements associated with the driven member with adequate lubrication being applied thereto without causing heat build up or excessive viscous drag.

Other features and advantages of the present invention will become readily apparent from the following detailed description, the appended drawings, and the accompanying claims.

BRIEF DESCRIPTION OF DRAWINGS

FIG. 1 is a longitudinal sectional view of mechanism having a clutch assembly embodying the principles of the present invention; and FIG. 2 is a fragmentary view similar to FIG. 1 illustrating certain parts of the present invention in a second position.

DETAILED DESCRIPTION OF A PREFERRED EMBODIMENT

While the present invention is susceptible of embodiment in various forms, there is shown in the drawings, and will hereinafter be described in detail, a presently preferred embodiment with the understanding that the present disclosure is to be considered as an exemplification of the invention, and is not intended to limit the invention to the specific embodiment illustrated.

Referring now to the drawings, wherein like reference numerals indicate like parts, a clutch-driven unit or assembly embodying the principles of the present invention is shown incorporated in a transmission apparatus 10, such as for tractor.

A transmission apparatus typically includes a plurality of gear assemblies which are selectively operated in response to actuation of associated clutch assemblies. The gear assemblies are selectively operated to provide a variety of torque-multiplying gear ratios. Although only one gear and clutch assembly combination is illustrated, it will be appreciated that the present invention is equally applicable to embodiments wherein a cooling fluid is simultaneously directed to more than one clutch assembly.

As illustrated, the apparatus 10 includes a housing 12 having a shaft 14 journalled for rotation relative to the housing. Bearing assembly 16 is provided to rotatably support the shaft 14 relative to the housing 16. Arranged in axially spaced relation on shaft 14 are two rotatable members 18 and 20.

In the illustrated embodiment, member 18 defines a drive member of the mechanism and member 20 defines a driven member of the mechanism. A friction clutch assembly 22 provides a friction coupling between the drive and driven members 18 and 20, respectively. A linearly displaceable, annular or ring-shaped clutch actuator 24 operates the clutch assembly.

As illustrated, the drive member 18 comprises a generally cup-shaped element 26 that is connected to shaft 14 for rotation therewith. Element 26 defines an annular internally splined portion 28 and a fluid receiving chamber portion 30.

In the illustrated embodiment, the rotatably driven member 20 comprises a gear 32 forming part of a gear arrangement within the transmission. Gear 32 is rotatably arranged on the shaft 14 for rotation relative to drive member 18 as by bearings 34. Thrust bearings 36 and 38 are preferably located on opposite sides of gear 32.

The clutch assembly 22 generally defines a clutch area of the apparatus and includes a pack of interleaved friction disks or plates 40 and 42 which are arranged between a back pressure plate 44 and the clutch actuator 24. The friction plates 40 are spline connected to the elongated splined portion 28 of element 26 such that they rotate with the shaft 14. Alternate plates 42 are spline connected to elongated splines provided on an axial extension 46 of driven member 20.

The back pressure plate 44 is spline connected to the element 26 and its axial displacement is limited by a suitable snap ring 48. One group of the plates 40 or 42 is provided with a friction facing material which is selected in combination with a lubricating fluid to provide a predetermined coefficient of friction between the plates. When sufficient axial pressure is applied to the plates, a drive connection is established and motion is transmitted between shaft 14 and member 20. As will be understood, torque transfer and rotation between shaft 14 and member 20 is controlled as a function of the axial compression of the friction plates as determined from the amount or level of pressure applied to the clutch assembly.

Clutch actuator 24 provides an axial compressive force against one end of the clutch assembly 22. The clutch actuator 24 is arranged for linear movement in response to sufficient fluid pressure in the chamber portion 30 of element 26. The clutch actuator 24 is appropriately sealed to retain hydraulic pressure rearward thereof in the chamber 30 as by means of a pair of conventional annular oil seals 49 and 50.

During modulated operation, the clutch assembly 22 is exposed to heat input. Heat input is generated from the friction plates 40, 42 slipping relative to each other under an increasing load. To dissipate this heat, the present invention includes an apparatus for delivering a cooling fluid to the clutch area in regulated quantities depending upon clutch operation.

Such a clutch cooling apparatus includes a conduit 54 for delivering cooling fluid to the clutch area. As illustrated, conduit 54 includes an axially extending fluid passage defined by the shaft 14. Such passage further includes at least one exhaust port 56 arranged proximate the clutch assembly for directing cooling fluid thereto. As will be appreciated, conduit 54 may have several branches joined in fluid communication thereto and extending therefrom for simultaneously directing cooling fluid to other clutch assemblies arranged within the transmission. Moreover, an additional exhaust port 58 may lead from the conduit 54 for directing lubricating fluid to the bearings 34, 36 and 38 associated with gear 32.

The clutch cooling apparatus further includes a sleeve 60 which is coaxially mounted on the shaft 14 adjacent the clutch actuator 24 for linear movement between first and second positions. Sleeve 60 defines at least one radial port 62 which is fluidically joined to exhaust port 56 when sleeve 60 is in its first position.

A clutch actuator return mechanism, preferably in the form of a compression spring 64, is captively received between a ring 66 extending from and secured to shaft 14 and a radial flange 68 defined at one end of sleeve 60. If required, one or more shims 76 may be used to bridge a gap between the clutch actuator 24 and the flanged end 68 of sleeve 60.

When the sleeve 60 is in its first position (FIG. 1), the other end of the sleeve 60 is urged against a tapered seat 70 defined by shaft 14. Preferably, sleeve 60 defines a tapered internal portion 72. As will be appreciated, the taper of seat 70 and the taper of internal portion 72 are complementary to each other. Immediately adjacent to the tapered seat 70, shaft 14 further defines a circumferential groove 74.

Upon depressurization of fluid chamber 30, the return spring 64 urges sleeve 60 into its first position. When the sleeve 60 is in a closed position, the internal tapered portion 72 on the sleeve coacts with the tapered seat 70 to retard cooling fluid from escaping around the sleeve 60. Conjointly therewith, the action of spring 64 acts to return clutch actuator 24 to a disengaged position.

Notably, with sleeve 60 in its first position, the radial port 62 defined thereby is fluidically joined to the exhaust port 56 of conduit 54. The radial port 62 permits a reduced or throttled flow (typically approximating 1 gallon per minute) of cooling lubricant from conduit 54 to the disengaged clutch.

Upon pressurization of the chamber portion 30, the actuator 24 is linearly displaced to the right as seen in FIG. 1. Linear movement of the clutch actuator 24 results in movement of the sleeve 60 toward its second position, illustrated in FIG. 2.

When the sleeve 60 is moved to its second position the sealing relationship between sleeve 60 and the tapered seat 70 on shaft 14 is broken and cooling fluid is allowed to exhaust from port 56 and cross groove 74 in greater quantities (typically approximating 5 gallons per minute) than was exhausted through the radial port 62. As such, a substantially unrestricted flow of cooling fluid is delivered to the clutch area upon clutch actuation than was delivered to the clutch area upon clutch disengagement. The increase in cooling fluid to the clutch area has the capability of dissipating heat input between the friction plates 40 and 42 of the clutch assembly.

The ability to modulate the lubricant flow to the clutch area based on clutch operation has several beneficial results. First, such a design makes the most efficient use of available cooling fluid flow to the recently engaged clutch. Second, although there is an increased flow to the recently engaged clutch, there remains an adequate flow to a disengaged clutch through radial port 62. Moreover, by reducing the flow to the disengaged clutch, a reduction in clutch drag is accomplished. That is, during clutch disengagement there is minimal clutch flow to the clutch area thereby minimizing the viscous drag problem between the rotating friction plates.

This invention has been described in terms of a specific embodiment set forth in detail, but it should be understood that this is by way of illustration only and that the invention is not necessarily limited thereto. Modifications and variations will be apparent from the disclosure and may be resorted to without departing from the spirit of the invention, as those skilled in the art will readily understand. Accordingly, such variations and modifications of the disclosed products are considered to be within the purview and scope of the invention and the following claims.

What is claimed:

1. An apparatus for cooling a clutch assembly with a hydraulic fluid, said clutch assembly including a drive member connected to a shaft, a driven member rotatably mounted on said shaft, clutch means for establishing a drive connection between said drive and driven members, and a linearly positionable fluid operated clutch actuator for controlling operation of said clutch means as a function of its linear position, said cooling apparatus comprising:

axially extending passage means defined by said shaft for delivering a hydraulic cooling fluid to said clutch means, said passage means including port means through which hydraulic fluid flows toward said clutch means;

control means for regulating the flow of hydraulic fluid to said clutch means, said control means including an axially extending sleeve arranged adjacent said clutch actuator and coaxially mounted on said shaft for linear movement between first and second positions in response to movement of said clutch actuator, said sleeve having an internal tapered surface which cooperates with a tapered seat defined on said shaft when said sleeve is in a first position to meter a relatively limited flow of fluid to said clutch means through a radial port defined by said sleeve and which is in fluid communication with said port means on said shaft;

an annular groove defined on said shaft linearly adjacent said tapered seat, said groove and the internal tapered surface on said sleeve cooperating together to define an annular passage to permit a relatively unrestricted flow and avoid throttling of cooling fluid to said clutch means when said sleeve is moved toward its second position; and resilient means for urging said sleeve toward its first position.

2. The apparatus according to claim 1 wherein said sleeve further defines a radial flange disposed at an end of said sleeve adjacent said clutch actuator, and said resilient means comprises a spring having one end which seats against said flange and urges said sleeve toward its first position.

* * * * *